United States Patent
Park

(10) Patent No.: US 12,511,459 B2
(45) Date of Patent: Dec. 30, 2025

(54) APPARATUS FOR AUTOMATICALLY DETERMINING VEHICLE ELECTRONIC CIRCUIT DIAGRAM

(71) Applicants: HYUNDAI MOTOR COMPANY, Seoul (KR); KIA CORPORATION, Seoul (KR)

(72) Inventor: Se Hoon Park, Yongin-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 640 days.

(21) Appl. No.: 17/956,256

(22) Filed: Sep. 29, 2022

(65) Prior Publication Data
US 2023/0124463 A1    Apr. 20, 2023

(30) Foreign Application Priority Data
Oct. 18, 2021    (KR) .................. 10-2021-0138048

(51) Int. Cl.
*G06F 30/31*    (2020.01)
(52) U.S. Cl.
CPC .................. *G06F 30/31* (2020.01)
(58) Field of Classification Search
CPC ..................................... G06F 30/31

USPC ........................................................ 716/102
See application file for complete search history.

(56) References Cited

FOREIGN PATENT DOCUMENTS

| CN | 113359686 A | * | 9/2021 | ......... G05B 23/0262 |
| JP | 2006-185383 A | | 7/2006 | |
| KR | 1999-0008692 A | | 2/1999 | |
| KR | 2003-0081675 A | | 10/2003 | |
| KR | 10-0747323 B1 | | 8/2007 | |

* cited by examiner

*Primary Examiner* — Eric D Lee
(74) *Attorney, Agent, or Firm* — MCDONNELL BOEHNEN HULBERT & BERGHOFF LLP

(57) ABSTRACT

An apparatus for automatically determining an electronic circuit diagram of a vehicle includes n system code determination unit configured to, when component codes of electronic components mounted on a vehicle are input, determine system codes of electronic systems configurable based on the electronic components, a circuit diagram determination unit configured to select and determine, from a circuit diagram database, standard circuit diagrams matched with the system codes determined by the system code determination unit, and a display unit configured to display the standard circuit diagrams determined by the circuit diagram determination unit to be matched with electronic systems predetermined for respective system codes.

11 Claims, 2 Drawing Sheets

APPARATUS FOR AUTOMATICALLY DETERMINING VEHICLE ELECTRONIC CIRCUIT DIAGRAM

CROSS REFERENCE TO RELATED APPLICATIONS

This application claims under 35 U.S.C. § 119(a) the benefit of priority to Korean Patent Application No. 10-2021-0138048 filed on Oct. 18, 2021, the entire contents of which are incorporated herein by reference.

BACKGROUND

(a) Technical Field

The present disclosure relates to an apparatus for automatically determining an electronic circuit diagram of a vehicle, and more particularly, to an apparatus for automatically determining and providing circuit diagrams of electric systems mounted on a vehicle.

(b) Background Art

With the recent electrification of vehicles, mechanical components mounted on vehicles are gradually being replaced by electronic components. In addition, in the case of an electric vehicle, a motor replaces the engine role of an internal combustion engine vehicle. In addition, in accordance with the demands of the times, electronic components in vehicles such as controllers and sensors are continuously increasing.

The increase in the number of such electronic components explosively increases the amount of power and signals exchanged between the electronic components, which increases the complexity of an electronic circuit.

In general, various electronic systems are mounted on a vehicle, and the type and number of electronic systems to be mounted may be different depending on the types of vehicles (i.e., vehicle models). Thousands of electronic components are usually mounted on one vehicle, and the electronic components constitute hundreds of electronic systems.

Conventionally, a designer manually analyzes and checks design information described in a product specification sheet of a vehicle to find or directly design a standard circuit diagram suitable for each electronic system. Based on the standard circuit diagram, the designer implements the design, such as the actual junction box and power scheme of a vehicle.

Thus, standard circuit diagrams are being designed for power and signal interconnection between electronic components by analyzing relationships among thousands of electronic components mounted on a vehicle.

However, analyzing and checking the relationship between the electronic components described in the product specification sheet and the standard circuit diagram depending on the designer's manual work causes excessive man hour (M/H) and increases the possibility of occurrence of human error. The increase in M/H and the occurrence of human error eventually lead to deterioration of design quality and malfunction of the electronic system.

The above information disclosed in this background section is only for enhancement of understanding of the background of the present disclosure and therefore it may contain information that does not form the prior art that is already known in this country to a person of ordinary skill in the art.

SUMMARY

The present disclosure is proposed for solving the above problems, and provides an apparatus for automatically determining an electronic circuit diagram of a vehicle by automatically configuring circuit diagrams of electronic systems built on the basis of electronic components mounted on the vehicle.

The objectives of the present disclosure are not limited to those as described above, and other unmentioned objectives of the present disclosure can be clearly understood from the following description by those of ordinary skill in the art to which the present disclosure pertains.

In one aspect of the present disclosure, an apparatus for automatically determining an electronic circuit diagram of a vehicle comprises a system code determination unit configured to, when component codes of electronic components mounted on a vehicle are input, determine system codes of electronic systems configurable based on the electronic components, a circuit diagram determination unit configured to select and determine, from a circuit diagram database, standard circuit diagrams matched with the system codes determined by the system code determination unit, and a display unit configured to display the standard circuit diagrams determined by the circuit diagram determination unit to be matched with electronic systems predetermined for respective system codes.

In an embodiment, the system code determination unit may be configured to retrieve out all system logical formulas configurable based on the component codes from the system logical formulas stored in the logical formula database, and to transmit, to the circuit diagram determination unit, system codes individually matched for respective logical formulas retrieved from the logical formula database.

In addition, the system code determination unit may be configured to determine, as applicable system logical formulas, system logical formulas configurable based on the component codes from the system logical formulas stored in the logical formula database, and to determine, as non-applicable system logical formulas, system logical formulas non-configurable based on the component codes from the system logical formulas stored in the logical formula database.

In addition, the system code determination unit may be configured to store the system codes matched with the applicable system logical formulas in a temporary storage, and not to store the system codes matched with the non-applicable system logical formulas in the temporary storage.

In addition, the system code may be configured to include a first code for identifiably defining respective electronic systems and a second code for identifiably defining a detailed type of the respective electronic systems.

In addition, the system code determination unit may be configured to, if there are duplicate system codes whose first codes are identical to each other among the system codes stored in the temporary storage, transmit the duplicate system codes to the display unit, and to determine, as system codes of the electronic systems actually mounted on a vehicle, duplicate system codes selected by a designer from the duplicate system codes displayed on the display unit.

In addition, the system code determination unit may be configured to transmit, to the circuit diagram determination unit, all of the system codes whose first codes are different from each other among the system codes stored in the temporary storage, and to transmit, to the circuit diagram determination unit, only the duplicate system codes selected by the designer among the duplicated system codes.

In addition, the system logical formula may be composed of a single component code or a logical formula in which two or more component codes are combined.

In addition, the system logical formula may be configured based on the component codes of electronic components predetermined among the electronic components constituting one electronic system.

In addition, the circuit diagram database may be a database in which standard circuit diagrams defining electronic systems mounted on all vehicles as respective circuit diagrams are stored in an identifiable manner on the basis of the system codes.

In addition, the logical formula database may be a database in which system logical formulas defining electronic systems mounted on all vehicles as respective logical formulas are stored in an identifiable manner on the basis of the system codes.

According to the means for solving the above problem, the present disclosure automatically configures and provides a circuit diagram of an electronic system built based on the electronic components when all of the component codes of the electronic components mounted on a vehicle are input, so that and when designing the circuit diagram of the system, the intervention of the designer is minimized to reduce the man hour (M/H) as well as prevent the occurrence of human errors, thereby improving the design quality of the electronic system.

DETAILED DESCRIPTION

Figure 1:
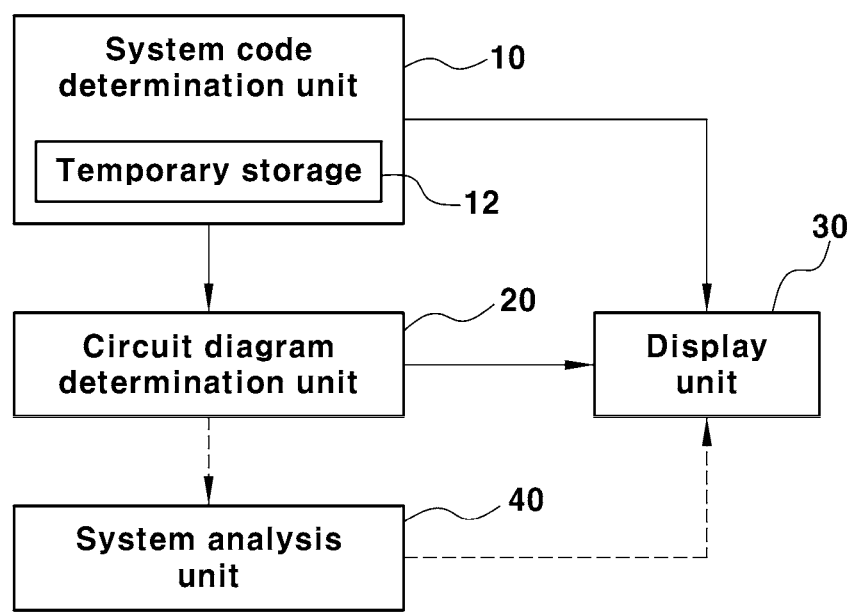
FIG. 1 is a block diagram illustrating an automatic determination apparatus of an electronic circuit diagram of a vehicle according to an embodiment of the present disclosure.

Specific structures or functions presented in embodiments of the present disclosure are only exemplified for the purpose of describing embodiments according to the concept of the present disclosure, which may be implemented in various forms. In addition, the present disclosure should not be construed as being limited to the embodiments described herein, and should be understood to include all modifications, equivalents, and substitutes included in the spirit and scope of the present disclosure.

In addition, throughout this specification, when a part "includes" a certain component, this means that other components may be further included, rather than excluding other components, unless otherwise stated.

In addition, terms such as " . . . unit", etc. described in this specification mean a unit that processes at least one function or operation, and the component indicated by the term may be implemented as a software module operated by a set program, a hardware module consisting of electronic devices, or a combination module in which the software module and the hardware module are combined.

Meanwhile, in the present specification, although terms such as "first" and/or "second" may be used to describe various components, the components are not limited to the above terms. The above terms are used only for the purpose of distinguishing one component from other components. For example, within the scope without departing from the scope of the rights according to the concept of the present disclosure, a first component may be referred to as a second component, and, similarly, a second component may also be referred to as a first component.

In general, various electronic systems are mounted on a vehicle, and the type and number of electronic systems to be mounted may be different depending on the types of vehicles (i.e., vehicle models). Thousands of electronic components are usually mounted on one vehicle, and the electronic components constitute hundreds of electronic systems.

Conventionally, a designer manually analyzes and checks design information described in a product specification sheet of a vehicle to find or directly design a standard circuit diagram suitable for each electronic system. Based on the standard circuit diagram, the designer implements the design, such as the actual junction box and power scheme of a vehicle.

Thus, standard circuit diagrams are designed for power and signal interconnection between electronic components by analyzing relationships among thousands of electronic components mounted on a vehicle.

However, analyzing and checking the relationship between the electronic components described in the product specification sheet and the standard circuit diagram depending on the designer's manual work causes excessive man hour (M/H) and increases the possibility of occurrence of human error. The increase in M/H and the occurrence of human error eventually lead to deterioration of design quality and malfunction of the electronic system.

Therefore, the present disclosure provides an apparatus for automatically determining an electronic circuit diagram of a vehicle. The automatic electronic circuit diagram determination apparatus is configured to automatically determine and provide a standard circuit diagram suitable for electronic systems applied to a vehicle when component codes of the electronic components described in the product specification sheet of the vehicle are input.

Hereinafter, embodiments of the present disclosure will be described with reference to the accompanying drawings. Elements described in the accompanying drawings are schematically illustrated for easy explanation of the embodiments of the present disclosure, so they may be different from the actually implemented forms.

Figure 2:
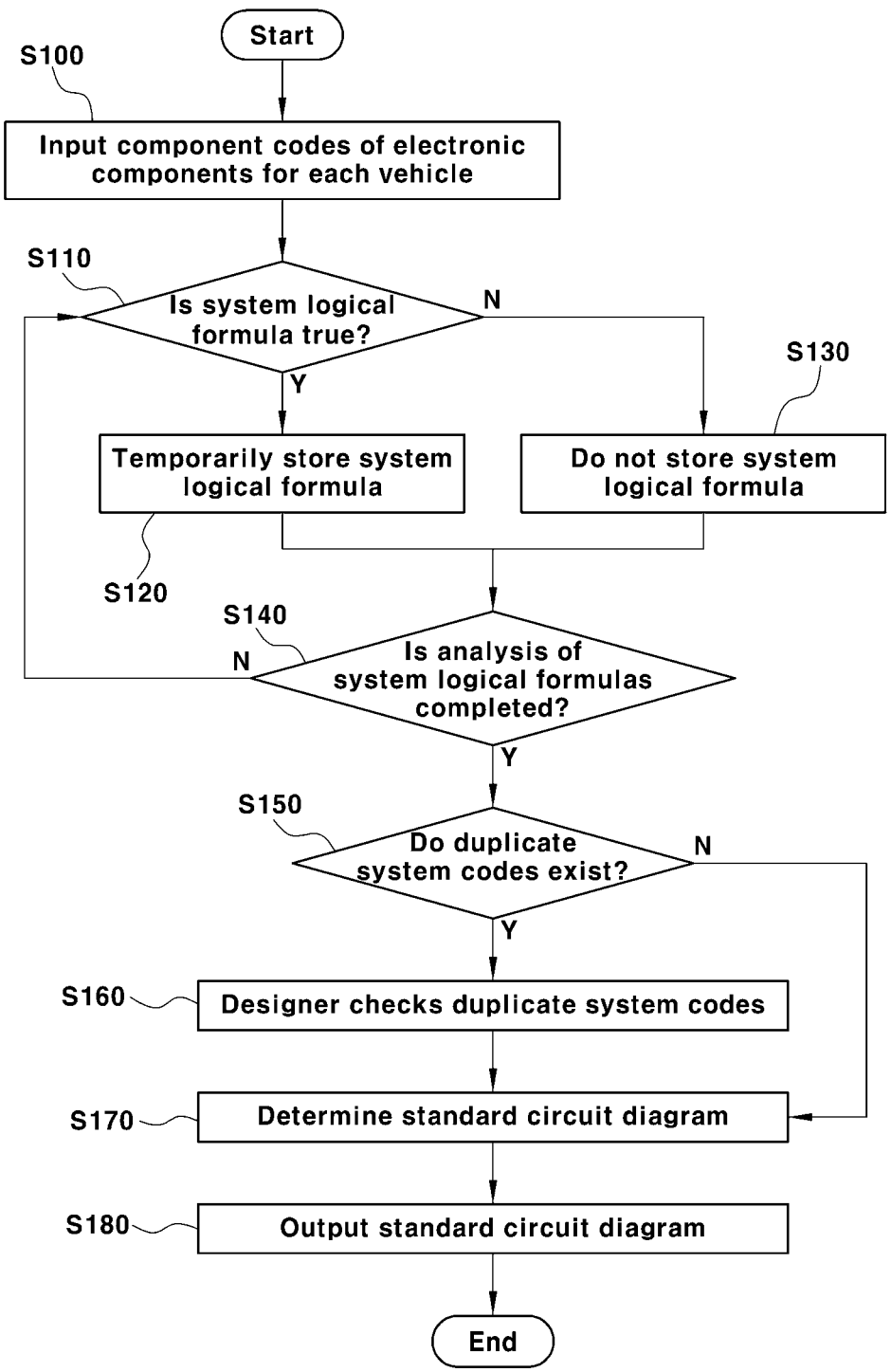
FIG. 2 is a flow chart illustrating an automatic determination method of an electronic circuit diagram of a vehicle according to an embodiment of the present disclosure.

FIG. 1 is a block diagram illustrating an automatic determination apparatus of an electronic circuit diagram of a vehicle according to an embodiment of the present disclosure, and FIG. 2 is a flow chart illustrating an automatic determination method of an electronic circuit diagram of a vehicle according to an embodiment of the present disclosure.

The automatic electronic circuit diagram determination apparatus according to the present disclosure is configured to automatically determine an electronic circuit diagram (i.e., a standard circuit diagram) suitable for electronic systems applied to a vehicle type when component codes of electronic components defined according to a vehicle type (i.e., a vehicle model) are input.

Vehicles are equipped with electronic systems according to their type. In addition, electronic systems mounted on a vehicle are classified for their functions. For example, an electronic system mounted on a vehicle includes a front wiper system, a headlamp system, an electric power steering system, and the like. The front wiper system is a system configured to wipe off rainwater falling on the windshield of a vehicle. The headlamp system is a system configured to illuminate the front side of a vehicle. The electric power steering system is a system configured to assist a driver's steering force.

As illustrated in FIG. 1, the automatic electronic circuit diagram determination apparatus includes a system code determination unit 10, a circuit diagram determination unit 20, and a display unit 30.

The automatic electronic circuit diagram determination apparatus executes steps S100 to S180 as illustrated in FIG. 2 through the system code determination unit 10, the circuit diagram determination unit 20, and the display unit 30. The automatic electronic circuit diagram determination apparatus determines and provides a standard circuit diagram of electronic systems applied for each vehicle by executing the steps S100 to S180.

The system code determining unit 10 is configured to, when component codes of all of electronic components mounted on a vehicle are input, determine system codes of electronic systems configurable based on the electronic components. Referring to FIG. 2, the component codes of the electronic components are input to the system code determining unit 10 for each vehicle at S100.

The component codes are codes indicating respective electronic components in an identifiable manner. The component codes are commonly applied to all vehicle models. The component code is a standardized code with a fixed number of digits. The component code may be composed of a combination of characters and numbers. For example, the component code may be composed of a combination of two characters and one number, and may be determined as LM1, DY1, or the like.

The system codes are codes that identifiably represent respective electronic systems. The system codes are commonly applied to all vehicle models. The system code is a standardized code with a predetermined number of digits. The system code is composed of a combination of numbers and characters.

Specifically, the system code is configured to include a first code for identifiably defining respective electronic systems and a second code for identifiably defining detailed types of respective electronic systems. The second cord is arranged continuously attached after the first code. The first code identifiably indicates different types of electronic systems. The second code identifiably indicates a detailed type of the electronic system defined by the first code. The first code may be composed of a number having a predetermined number of digits, and the second code may be composed of a character having a predetermined number of digits. For example, the system code may be composed of a combination of three numbers and one character. The system code may be defined as 001A, 151B, or the like.

The detailed type of the electronic system is determined according to a standard circuit diagram that matches electronic systems of the same type. That is, the detailed type of the electronic system represents a standard circuit diagram in which a first code matches the same electronic systems. In other words, the detailed type of the electronic system means a standard circuit diagram type in which a first code is matched to the same electronic systems. The detailed type of the electronic system may be determined according to a standard circuit diagram matching the electronic system. Even if the first code is the same electronic system, a different standard circuit diagram may be matched according to the detailed type thereof.

At least one or more of the electronic systems mounted on a vehicle may have a plurality of detailed types. In the case of an electronic system in which two or more detailed types exist, different standard circuit diagrams are matched according to the detailed types.

For example, the front wiper system has two detailed types, classified into A type and B type. The A-type front wiper system and the B-type front wiper system are defined by different system logical formulas, and different standard circuit diagrams are applied thereto.

The system code determining unit 10 has a logical formula database in which system logical formulas are stored. In the logical formula database, system logical formulas for electronic systems that can be mounted on all vehicles are matched to respective system codes and stored. In other words, the logical formula database stores system logical formulas individually defining all electronic systems mounted on different vehicle models.

The system logical formulas stored in the logical formula database are composed of different logical formulas. The system logical formulas stored in the logical formula database define different logical formulas for electronic systems mounted on all vehicle models.

The system logical formulas are logical formulas that are defined by a combination of component codes of electronic components constituting an electronic system. The system logical formulas are logical formulas in which one system code is defined by using at least one component code. The system logical formulas are stored in a logical formula database so that they are identifiable based on the system code.

The system logical formulas are composed of one component code or a logical formula combining two or more component codes. The system logical formula is composed of a Boolean logical expression type.

The electronic systems are defined by different system logical formulas. System codes are defined by different system logical formulas. In addition, electronic systems are defined by different system logical formulas according to their detailed types. That is, the system logical formulas are composed of different logical formulas according to the detailed types of the matched electronic systems. The system logical formulas stored in the logical formula database are defined so as to be identifiable from each other on the basis of their component codes.

When all of the component codes of electronic components mounted on a vehicle are input, the system code determination unit 10 determines system logical formulas configurable based on the component codes through the retrieval of them from the system logical formulas stored in the logical formula database.

That is, the system code determination unit 10 retrieves out a system logical formula configurable by combining the input component codes from the logical formula database. To this end, the system code determination unit 10 determines whether the system logical formulas stored in the logical formula database are configurable logical formulas on the basis of the input component codes. The input component codes mean component codes input to the system code determination unit 10.

The system code determination unit 10 compares the logical formula component codes constituting respective system logical formulas with the input component codes. The logical formula component codes mean component codes constituting respective system logical formulas. The system logic formula consists of one or more logical formula component codes. Both the input component codes and the logical formula component codes are component codes that represent electronic components and are standardized codes with the same number of digits. That is, the input component codes and the logical formula component codes are component codes that represent the electronic components constituting a vehicle electronic system.

The system code determination unit 10 determines whether each system logical formula is true or not according to a result of comparing the logical formula component code with the input component code at S110. The system code determination unit 10 determines that the system logical formula is true if the logical formula component codes constituting the system logical formula match any one of the input component codes.

That is, the system code determination unit 10 determines that a system logical formula consisting only of logical formula component codes matching any one of the input component codes is true. The system code determination unit 10 determines the system logical formula determined to be true as an applicable system logical formula.

In other words, the system code determination unit 10 determines the system logical formulas configurable base on input component codes as applicable system logical formulas.

The applicable system logical formula is a system logical formula of an electronic system that can be actually mounted on a target vehicle. The target vehicle is a vehicle capable of composing all of the in-vehicle electronic systems with electronic components corresponding to the input component codes.

The system code matched with the applicable system logical formula is temporarily stored in a temporary storage 12 at S120. Referring to FIG. 1, the temporary storage 12 may be provided in the system code determination unit 10. Although not illustrated in the drawings, the temporary storage 12 may be separately provided outside of the system code determination unit 10.

In addition, the system code determination unit 10 determines that the system logical formula including one or more inconsistent logical formula component codes is false. The system code determination unit 10 determines the system logical formula determined to be false as a non-applicable system logical formula. The inconsistent logical component code means a logical component code that does not match any one of the input component codes.

In other words, the system code determination unit 10 determines, among the system logical formulas stored in the logical formula database, system logical formulas non-configurable based on the input component codes as non-applicable system logical formulas.

The system code matched with the non-applicable system logical formula is not stored in the temporary storage 12. The system code determination unit 10 does not store the system code matched with the non-applicable system logical formula in the temporary storage 12 at S130.

The system code determination unit 10 sequentially analyzes the system logical formulas stored in the logical formula database, and as a result of the analysis, only the system code of the applicable system logical formula determined to be configurable based on the input component codes is stored in the temporary storage 12.

The system code determination unit 10 stores the system code of the applicable system logical formula in the temporary storage 12, and then determines whether all of the system logical formulas in the logical formula database have been completely analyzed at S140.

The system code determination unit 10 transmits the system codes stored in the temporary storage 12 directly to the circuit diagram determination unit 20 or transmits some of the system codes stored in the temporary storage 12 to the display unit 30 when all of the system logical formulas have been completely analyzed.

The system code determination unit 10 determines whether duplicate system codes exist among the system codes stored in the temporary storage 12 at S150. The system code is composed of a first code indicating an electronic system and a second code indicating a detailed type of the electronic system. Accordingly, the system code determination unit 10 may determine whether duplicate system codes exist in the temporary storage 12 on the basis of the first codes of the respective system codes.

When there are duplicate system codes having the same first codes among the system codes stored in the temporary storage 12, the system code determination unit 10 transmits the duplicate system codes to the display unit 30. The duplicate system codes mean system codes in which the first codes are the same, but the second codes are different from each other.

In addition, if there are no duplicate system codes having the same first codes among the system codes stored in the temporary storage 12, the system code determination unit 10 transmits the system codes stored in the temporary storage 12 directly to the circuit diagram determination unit 20.

The display unit 30 outputs and displays the duplicate system codes received from the system code determination unit 10 such that a designer can visually check the duplicate system codes.

The designer directly checks and determines whether the duplicate system codes displayed on the display unit 30 match the system codes of the electronic systems actually mounted on a target vehicle at S160. The designer inputs, to the system code determination unit 10, the system codes of the electronic systems actually mounted on a target vehicle among the duplicate system codes displayed on the display unit 30.

At this time, the designer inputs the system codes to the system code determination unit 10 through a user interface. The user interface may be an input device such as a keyboard, a touchpad, or a mouse. Further, the input component codes are also input to the system code determination unit 10 through the user interface.

When the designer completes the input of the duplicate system codes, that is, when all the duplicate system codes selected by the designer are input, the system code determination unit 10 inputs both the system codes stored in the temporary storage 12 and all of the duplicated system codes input through the user interface are transmitted to the circuit diagram determination unit 20.

In other words, the system code determination unit 10 transmits all of the non-duplicate system codes having different first codes among the system codes stored in the temporary storage 12 to the circuit diagram determination unit 20, and transmits only the duplicate system codes selected by the designer to the circuit diagram determination unit 20.

In the case of system logical formulas defining the same system codes having the same first codes, even if they are determined to be false, they may be determined as an applicable system logical formula due to an analysis error or the like.

Accordingly, in the case of duplicate system codes having the same first codes among the system codes stored in the temporary storage 12, the designer once more checks whether the system code of the electronic system actually mounted on a target vehicle is correct, thereby increasing the detection accuracy and analysis accuracy for the system logical formula.

In addition, electronic systems may be mounted on one vehicle for each detailed type according to vehicle types. That is, a plurality of electronic systems having the same first codes and different second codes may all be mounted on one vehicle according to vehicle types. For example, the front wire system may be divided into types A and B according to a detailed type thereof. The front wire system may be divided into a type A and a type B according to the types of electronic components constituting the system. Either one or both of the A-type front wire system and the B-type front wire system may be mounted on one vehicle depending on vehicle types.

The circuit diagram determination unit 20 is configured to determine standard circuit diagrams individually matched with the system codes transmitted from the system code determination unit 10.

The standard circuit diagram is an electronic circuit diagram defining an electrical interconnection state (i.e., a circuit wiring state) between electronic components constituting one electronic system, a circuit wiring state between the electronic components and a vehicle power source, or the like. That is, the standard circuit diagram is a circuit diagram standardized by previously defining a circuit wiring structure of respective electronic systems mounted on a vehicle.

The circuit diagram determination unit 20 is provided with a circuit diagram database in which standard circuit diagrams for each electronic system are stored. The circuit diagram database is a database in which standard circuit diagrams designed by previously defining electronic systems mounted on all vehicle models as respective circuit diagrams are stored. The standard circuit diagrams are stored in a circuit diagram database so as to be identifiable based on the system code.

When the system codes are input from the system code determination unit 10, the circuit diagram determination unit 20 determines a standard circuit diagram that matches respective system codes one-to-one at S170. At this time, the circuit diagram determination unit 20 selects and determines a standard circuit diagram that matches respective system codes from the standard circuit diagrams stored in the circuit diagram database.

In this case, the circuit diagram determination unit 20 may determine the standard circuit diagram of respective electronic system while accurately classifying the detailed types of the electronic system. This is because the system code includes the second code indicating the detailed type of the electronic system.

The circuit diagram database is configured to identify respective standard circuit diagrams on the basis of the system codes. The circuit diagram determination unit 20 transmits, to the display unit 30, information of the standard circuit diagram selected based on the system code input from the system code determination unit 10. When transmitting information of the standard circuit diagram to the display unit 30, the circuit diagram determination unit 20 also transmits specified information of the electronic system to which respective standard circuit diagram is applied.

The display unit 30 outputs and displays the standard circuit diagram received from the circuit diagram determination unit 20 at S180. When outputting the standard circuit diagram, the display unit 30 also outputs and displays specified information of the electronic system to which the standard circuit diagram is applied. The specified information of the electronic system includes a name, a detailed type, etc. of the electronic system. The designer can visually check the standard circuit diagram displayed on the display unit 30, information of the electronic system, and the like.

In addition, the automatic electronic circuit diagram determination apparatus of the present disclosure may be configured to further include a system analysis unit 40.

In the system analysis unit 40, specified information on respective electronic system and specified information on respective standard circuit diagram are matched in advance for each system code and stored.

When the system code is transmitted from the circuit diagram determination unit 20, the system analysis unit 40 calculates the number and ratio of electronic systems applied for each vehicle section on the basis of information matched to respective system code. The vehicle section is divided into powertrain, chassis, electronic device, and the like. In addition, the system analysis unit 40 also determines the regional groups to which respective electronic system is applied.

When the system code is input, the system analysis unit 40 analyzes the electronic system and standard circuit diagram matching respective system code, and transmits the analysis result to the display unit 30.

The system analysis unit 40 may transmit and display various pieces of information analyzed according to preset conditions and methods to the display unit 30. In addition, the system analysis unit 40 may calculate the data analysis result in graph and table types and transmit the same to the display unit 30.

In addition, the system code determination unit 10, the circuit diagram determination unit 20, the system analysis unit 40, etc. constituting the automatic electronic circuit diagram determination apparatus of the present disclosure are composed of a software module operated by a set program, a hardware module composed of electronic elements, or a combination module in which the software module and the hardware module are combined.

On the other hand, in the present disclosure, the system logical formula is configured based on component codes of core electronic components constituting one electronic system. The core electronic component is a predetermined electronic component as a main component representing respective electronic system. The core electronic components of respective electronic system are identified and determined in advance. The core electronic component may be determined by a designer.

For example, the front wiper system is configured to include electronic components such as a wiper motor, a rain sensor, a multi-function switch, a relay, a fuse, and a controller. A core electronic component of such a front wiper system may be a wiper motor and a rain sensor. In this case, a system logical formula defining the front wiper system is composed of a logical formula in which a component code of the wiper motor and a component code of the rain sensor are combined.

While the embodiments of the present disclosure have been described in detail in from foregoing, the terms or words used in the present specification and claims should not be construed as being limited to conventional or dictionary meanings.

While a number of exemplary aspects and embodiments have been discussed above, those of skill in the art will recognize that still further modifications, permutations, additions and sub-combinations thereof of the features of the disclosed embodiments are still possible. It is therefore intended that the following appended claims and claims hereafter introduced are interpreted to include all such modifications, permutations, additions and sub-combinations as are within their true spirit and scope.

The invention claimed is:

1. An apparatus for automatically determining an electronic circuit diagram of a vehicle comprises:
   a system code determination unit configured to, when component codes of electronic components mounted on a vehicle are input, determine system codes of electronic systems configurable based on the electronic components;
   a circuit diagram determination unit configured to select and determine, from a circuit diagram database, standard circuit diagrams matched with the system codes determined by the system code determination unit; and
   a display unit configured to display the standard circuit diagrams determined by the circuit diagram determination unit to be matched with electronic systems predetermined for respective system codes.

2. The apparatus according to claim 1, wherein the system code determination unit is configured to retrieve all system logical formulas configurable based on the component codes from system logical formulas stored in a logical formula database, and to transmit, to the circuit diagram determination unit, system codes individually matched for respective logical formulas retrieved from the logical formula database.

3. The apparatus according to claim 2, wherein the system code determination unit is configured to determine, as applicable system logical formulas, system logical formulas configurable based on the component codes from the system logical formulas stored in the logical formula database, and to determine, as non-applicable system logical formulas, system logical formulas non-configurable based on the component codes from the system logical formulas stored in the logical formula database.

4. The apparatus according to claim 3, wherein the system code determination unit is configured to store system codes matched with the applicable system logical formulas in a temporary storage, and not to store system codes matched with the non-applicable system logical formulas in the temporary storage.

5. The apparatus according to claim 4, wherein the system codes are configured to include a first code for identifiably defining respective electronic systems and a second code for identifiably defining a detailed type of the respective electronic systems.

6. The apparatus according to claim 5, wherein the system code determination unit is configured to, if there are duplicate system codes whose first codes are identical to each other among the system codes stored in the temporary storage, transmit the duplicate system codes to the display unit, and to determine, as system codes of the electronic systems actually mounted on a vehicle, duplicate system codes selected by a designer from the duplicate system codes displayed on the display unit.

7. The apparatus according to claim 6, wherein the system code determination unit is configured to transmit, to the circuit diagram determination unit, all of the system codes whose first codes are different from each other among the system codes stored in the temporary storage, and to transmit, to the circuit diagram determination unit, only the duplicate system codes selected by the designer among the duplicated system codes.

8. The apparatus according to claim 2, wherein the system logical formulas are composed of a single component code or a logical formula in which two or more component codes are combined.

9. The apparatus according to claim 8, wherein the system logical formulas are configured based on the component codes of electronic components predetermined among the electronic components constituting one electronic system.

10. The apparatus according to claim 2, wherein the logical formula database is a database in which system logical formulas defining electronic systems mounted on all vehicles as respective logical formulas are stored in an identifiable manner based on the system codes.

11. The apparatus according to claim 1, wherein the circuit diagram database is a database in which standard circuit diagrams defining electronic systems mounted on all vehicles as respective circuit diagrams are stored in an identifiable manner based on the system codes.

* * * * *